United States Patent [19]

Mitchell et al.

[11] 4,124,061

[45] Nov. 7, 1978

[54] THERMAL ENERGY STORAGE UNIT

[75] Inventors: Rex C. Mitchell, Calabasas; Joseph Friedman, Encino; Richard J. Holl, Irvine; Charles R. Easton, Palos Verdes, all of Calif.

[73] Assignee: Rockwell International Corporation, El Segundo, Calif.

[21] Appl. No.: 737,361

[22] Filed: Nov. 1, 1976

[51] Int. Cl.$^2$ .............................................. F28D 21/00

[52] U.S. Cl. ........................................ 165/1; 126/400; 165/104 S; 165/DIG. 4

[58] Field of Search ..................... 165/104 S, DIG. 4; 126/400; 219/325, 326, 378

[56] References Cited

U.S. PATENT DOCUMENTS

| | | | |
|---|---|---|---|
| 1,959,286 | 5/1934 | Grebe | 165/DIG. 4 X |
| 2,933,885 | 4/1960 | Benedek et al. | 237/1 A X |
| 3,295,591 | 1/1967 | Thomason | 165/DIG. 4 X |
| 3,773,031 | 11/1973 | Laing | 165/104 S X |
| 3,974,462 | 8/1976 | Pacault | 165/DIG. 4 X |

*Primary Examiner*—Albert W. Davis, Jr.

*Attorney, Agent, or Firm*—L. Lee Humphries; Robert M. Sperry

[57] ABSTRACT

A thermal storage unit comprising a bed of particulate solid material, a liquid situated in heat-exchanging relation with said bed and cooperating with said bed to define a liquid-solid system containing a thermocline, and means for introducing liquid into and extracting liquid from said liquid-solid system.

5 Claims, 3 Drawing Figures

HOT FLUID FROM HEAT SOURCE
RETURN
HEAT INPUT
HEAT EXTRACTION
HOT FLUID TO SUPPLY ENERGY
RETURN
P
P
2
4
6
8
10
12
14
16
18
20
22
24
26
28
30
32
34
36
38
40
42

THERMAL ENERGY STORAGE UNIT

BACKGROUND OF THE INVENTION

1. Field of Invention

This invention relates to thermal energy storage systems and is particularly directed to a liquid-solid thermal energy storage system having a thermocline.

2. Description of the Prior Art

As the world's population becomes aware of the decline of the world's oil reserves, there is developing increasing interest in alternative energy systems. Thus, considerable study is being directed to solar energy systems. However, due to dirunal temperature changes, cloudiness and various other matters, the problem of thermal storage has been one of the major problems. In this connection, the late Dr. Farrington Daniels, noted physical chemist and past president of the Solar Energy Society, presents an excellent morphological survey of thermal energy storage concepts in his book, "Direct Use of the Sun's Energy, " Yale University, 1964. Dr. Daniels divides thermal energy storage concepts into three basic categories:

1. Sensible Heat — Storage by heat capacity
2. Physcial Changes — Particularly heats of fission and/or vaporization
3. Reversible Chemical Reaction When economic analysis is made of these three categories, it becomes apparent that the two major considerations are: the inventory cost of the heat storage medium and container and, secondly, the engineering complexity of inputting and extracting the heat. Most analyses tend to favor sensible heat storage as the most economically and operationally attractive system. For temperatures up to about 200° F., water is by far the best medium. To quote Dr. Daniels, "Water has about the highest heat capacity per kilogram per liter or per dollar of any ordinary material." The next lowest price heat storage medium is gravel or crushed rock, which is available at a cost of a few dollars per ton and is suitable for storage of heat at temperatures up to at least 1500° F., the upper limit being determined by the fluid which flows through the rock bed to input or extract heat. Rock has been used as a heat storage medium for many years in "pebble bed" heaters, in which a gas (usually air) flows through the bed to input or extract heat. A major limitation of such heaters is that they do not have a thermocline, and the temperature of the exiting hot gas during heat extraction decreases rapidly from the storage temperature. It is known that water (and other liquids) may produce a "thermocline", that is, the hot and cold water may be made to separate into layers having a fairly distinct boundary, which rises or lowers within the container as water is added or withdrawn, so that the temperature of the water being drawn off can be substantially constant until the thermocline is reached and, at that point, will drop sharply to the temperature of the unheated water. This phenomenon is familiar in domestic hot water heaters. In contrast, where rock is the thermal storage medium in "pebble bed heaters", the temperature tends to increase gradually when heat is input, and to decrease gradually, as heat is withdrawn.

It will be apparent that the thermocline principle is advantageous, but has, heretofore, been limited to relatively low temperature, all liquid thermal storage systems, whereas rock has been capable of storing heat at considerably higher temperatures but has been subject to supply degredation in temperature.

BRIEF SUMMARY AND OBJECTS OF INVENTION

These disadvantages of the prior art are overcome with the present invention and a novel thermal storage system is proposed which permits the thermocline principle to be employed with rock thermal storage systems and, consequently at considerably higher temperatures than have been economically feasible with the prior art systems.

The advantages of the present invention are preferably attained by controlling such factors as bed material and particle size, fluid velocity, void fraction and method of fluid distribution so as to produce a thermocline in the bed of crushed rock or the like and, thus, to obtain the thermocline principle with storage temperatures up to at least 1500° F.

Accordingly, it is an object of the present invention to provide an improved thermal storage system.

Another object of the present invention is to provide a sensible heat storage system incorporating the thermocline principle and capable of storing heat up to at least 1500° F.

A further object of the present invention is to provide a sensible heat storage system incorporating the thermocline principle in a particulate bed system.

A specific object of the present invention is to provide a sensible heat storage system incorporating the thermocline principle in a particulate bed system and capable of storing heat up to at least 1500° F. by controlling the bed material and particle size, fluid velocity, void fraction and method of fluid distribution.

These and other objects and features of the present invention will be apparent from the following detailed description, taken wth reference to the accompanying drawing.

DETAILED DESCRIPTION OF INVENTION

Figure 1:
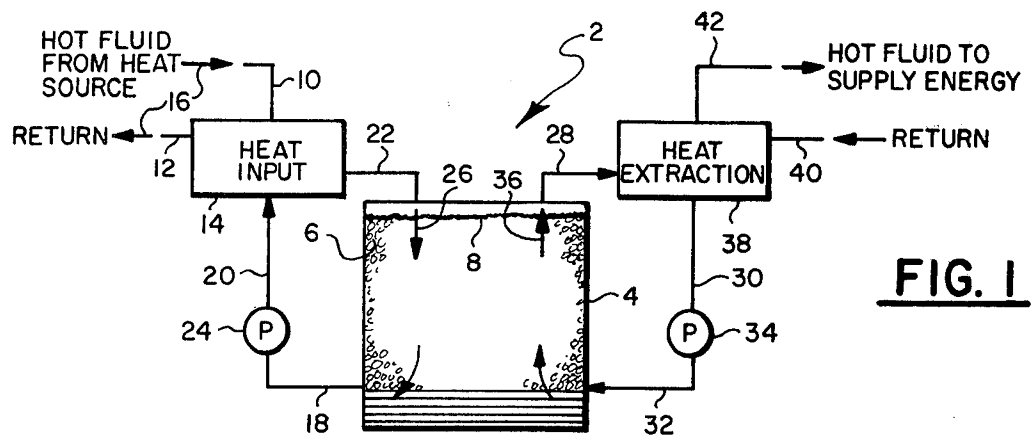
FIG. 1 is a diagrammatic representation of a thermal storage system embodying the present invention with parts shown in section.

In that form of the present invention chosen for purposes of illustration, FIG. 1 shows a thermal storage system, indicated generally at 2, comprising a fluid-tight container 4 filled with particulate solid material, indicated generally at 6, and having a liquid, indicated generally at 8, filling the interstices between adjacent particles of the particulate solid material 6. To input heat to the container 4 for storage, hot fluid from a suitable heat source, not shown, such as a furnace, nuclear reactor, solar furnace or the like, is supplied by pipes 10 and 12 to a suitable input heat exchanger 14, as indicated by arrows 16. Meanwhile, suitable means such as pipes 18, 20 and 22 and pump 24 serve to draw the liquid 8 from the bottom of container 4 through pipe 18, pass the liquid 8 through input heat exchanger 16 to be heated by the hot fluid from the heat source, and supply the heated liquid 8 through pipe 22 to the top of container 4, as indicated by arrow 26. To extract heat from container 4, suitable means, such as pipes 28, 30 and 32 and pump 34 serve to draw the heated liquid 8 from the top of container 4, as indicated by arrow 36, supply the heated liquid 8 to suitable output heat exchanger 38 and return the liquid 8 to the bottom of the container 4. In addition, means such as pipes 40 and 42 serve to pass a suitable fluid through the output heat exchanger 38, to be heated by the liquid 8, and deliver the heated fluid to suitable heat utilization means, not shown, such as a turbine-generator set or a space heating system.

From the foregoing description, it will be seen that the liquid 8 in container 4 flows downward during thermal input and flows upward during thermal output. This arrangement serves to maintain the liquid 8 hotter near the top of container 4 than near the bottom of container 4.

In a typical example, the container 4 would be a cyindrical tank, 64 feet in diameter and 57 feet high, containing 11,000 tons of crushed granite rock and coarse sand plus 310,000 gallons of a commercial heat transfer fluid, such as that sold by Exxon Corporation under the tradename "Caloria HT43". This container would have a thermal storage capacity of about 200 thermal megawatt-hours operating over a temperature range between 218° C. and 302° C.

Figure 2:
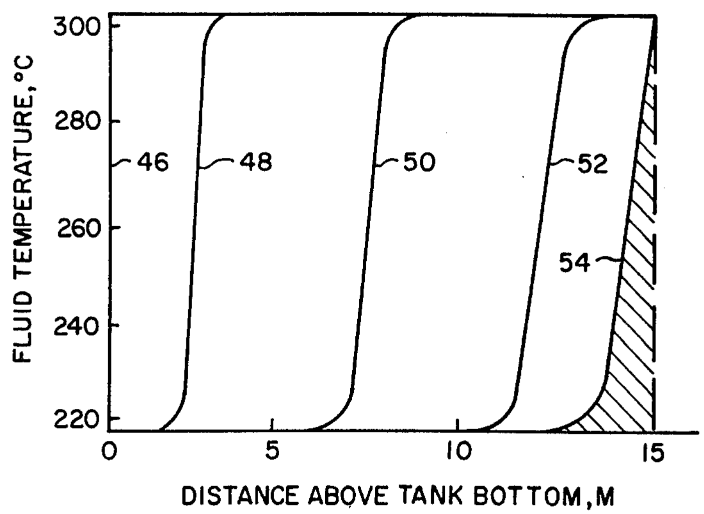
FIG. 2 is a diagrammatic representative showing the location of the thermocline in the thermal storage unit of FIG. 1 as heated fluid is extracted.

Assuming that the rock and liquid in the container 4 are initially at an equilibrium temperature of 302° C., a thermocline will be established at the bottom of the container 4, as indicated by vertical line 46 in FIG. 2. In order to extract heat from the thermal storage unit 2, fluid is extracted from container 4 via outlet pipe 28 at a temperature of 302° C., gives up some of its heat in the heat exchanger 38 and is returned to the bottom of container 4 via inlet pipe 32 at a temperature of about 218° C. As this occurs, the thermocline will move upward in the container 4, as indicated at line 48. Above the thermocline 48, the temperature of the fluid will be 302° C., while below the thermocline 48 the temperature of the fluid will be 218° C. As more heat is extracted from the thermal storage unit 2, the thermocline will continue to move upward within the container 4, as indicated by lines 50 and 52. Eventually, the thermocline will approach the top of the container 4, as indicated by line 54. When this occurs, the temperature of the fluid drawn through oulet pipe 28 will fall rapidly to the lower temperature of 218° C. Preferably, however, the heat extraction will be discontinued prior to reaching this level and heated fluid at 302° C. will be supplied to the container 4 via input pipe 22 to drive the thermocline downward to recharge the thermal storage unit 2. Thereafter, the heat extraction operation can be renewed.

Figure 3:
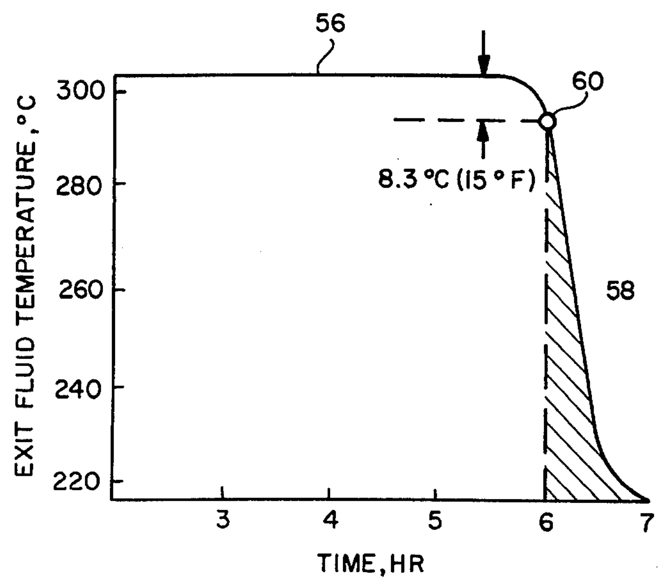
FIG. 3 is a diagrammatic representation showing the temperature of fluid being extracted from the thermal storage unit of FIG. 1 as a function of time.

FIG. 3 is a curve showing the temperature of the fluid extracted from the container 4 via outlet pipe 28 as a function of time. As described above, it has been found that the temperature of the exit fluid remains essentially constant at about the top operating temperature, as indicated by line 56, until most of the energy in the thermal storage unit 2 has been extracted. Then, the exit fluid temperature begins to drop rapidly, as indicated by line 58. Preferably, a cut-off point, such as point 60, will be established at which the heat extraction operation will be discontinued. If the cut-off point is set at 293.7° C. (that is, 8.3° C. below the upper limit of 302° C.), some of the stored thermal energy will remain in the container 4, as indicated by the shaded areas in FIGS. 2 and 3. This energy can be recovered, but only at continually decreasing temperatures, as indicated by curve 58 of FIG. 3. However, dividing the volume of the shaded area of FIG. 2 into the total area of FIG. 2 yields a value which may be termed the "extraction efficiency" of the thermal storage unit 2. Using the figures given above, the extraction efficiency of the typical example is 95%.

There are many design and operating parameters which are necessary or desirable in order to have a successful efficient and economical thermal storage system of the type described above. For example, the system must be operated in an orientation such that the relatively cold fluid enters or leaves adjacent the bottom of the container 4, while relatively hot fluid enters or leaves adjacent the top of the container 4. Moreover, the fluid distribution systems at the top and bottom of container 4 should be designed to minimize turbulence.

In order to assure that a thermocline will be established within the tank 4, there are several parameters which must be observed. Among these parameters, the ratio of the void volume to the total volume, (this ratio is referred to as the "void fraction") should be less than about 0.4. Similarly, where two sizes of solids are used, the ratio of the average diameter of the large size solids to the average diameter of the small size solids should be not less than about eight. In addition, the superficial velocity should be in the range of about 4 to 20 feet per hour. The superficial velocity is the fluid volumetric flow rate divided by the tank cross-sectional area, ($\pi D^2/4$). Finally, the ratio of the height to diameter of container 4 should be in the range of about 0.2 to 1.5.

Obviously, numerous variations and modifications may be made without departing from the present invention. Accordingly, it should be clearly understood that the forms of the present invention described above and shown in the accompanying drawing is illustrative only and is not intended to limit the scope of the present invention.

What is claimed is:

1. A thermal storage unit comprising:

a container, a bed of particulate solid material located in said container, the ratio of the void volume to the total volume of said bed being less than about 0.4 and the ratio of the height to the diameter of said bed being within the range of from about 0.2 to 1.5, a liquid situated in heat-exchanging relation with said bed and cooperating with said bed to define a liquid-solid system containing a thermocline, and means for introducing liquid into and extracting liquid from said liquid-solid system, said means being capable of introducing said liquid in an amount to provide a superficial velocity of said liquid through said container within the range of from about 4 to 20 feet per hour.

2. The thermal storage unit of claim 1 wherein said means for introducing liquids comprises:

means for introducing and extracting relatively cold fluid adjacent the bottom of said bed, and means for introducing and extracting relatively hot fluid adjacent the top of said bed.

3. The thermal storage unit of claim 1 wherein:

said bed is composed of two sizes of particulate material and the ratio of the average diameter of the large size particles to the average diameter of the small size particles is not less than about eight.

4. A thermal storage unit comprising:

a container, a bed of crushed gravel located in said container, the ratio of the void volume to the total volume of said bed being less than about 0.4 and the ratio of the height to the diameter of said bed being within the range from about 0.2 to 1.5, a liquid situated in a heat-exchange relationship with said bed and cooperating with said bed to define a liquid-solid system containing a thermocline, means for introducing and extracting relatively cold liquid adjacent the bottom of said bed, and means for introducing and extracting relatively hot liquid adjacent the top of said bed, both of said means providing for the introduction of liquid in an amount to provide a superficial velocity of said liquid through said container within the range of from about 4 to 20 feet per hour.

5. A method of storing and recovering thermal energy comprising:

providing a container having located therein a bed of crushed rock and a liquid in a heat-exchange relationship with said rock, establishing a thermocline in said liquid whereby the cold fluid settles to the bottom portion of the container and hot liquid rises to the top portion of the container, introducing and extracting cold liquid adjacent the top portion of said container as desired, introducing and extracting hot liquid adjacent the bottom portion of said container as desired, said introduction and extraction of liquid in each instance being at a rate to provide a superficial velocity of said liquid through said container within the range of from about 4 to 20 feet per hour.

* * * * *

UNITED STATES PATENT AND TRADEMARK OFFICE

CERTIFICATE OF CORRECTION

PATENT NO. : 4,124,061

DATED : November 7, 1978

INVENTOR(S) : Rex C. Mitchell et al

It is certified that error appears in the above-identified patent and that said Letters Patent are hereby corrected as shown below:

Cover Page [73] Assignee: delete "Rockwell International Corporation, El Segundo, California" and insert therefor --Rockwell International Corporation, El Segundo, California, and McDonnell Douglas Corporation, Long Beach, California, part interest each --.

Column 6, line 11, delete "top" and insert therefor -- bottom --.

Column 6, line 12, delete "bottom" and insert therefor -- top --

Signed and Sealed this

*First* Day of *May 1979*

[SEAL]

*Attest:*

RUTH C. MASON
*Attesting Officer*

DONALD W. BANNER
*Commissioner of Patents and Trademarks*